United States Patent Office 3,437,629
Patented Apr. 8, 1969

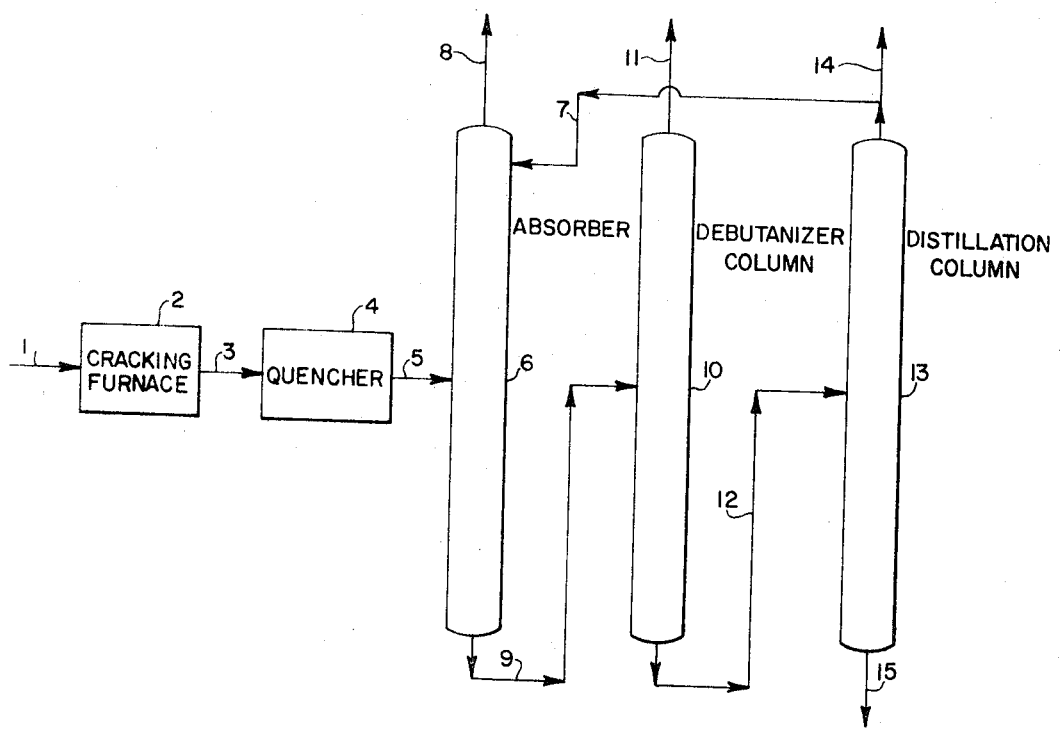

3,437,629
HYDROGENATED POLYMERIZED DAC-B
Paul T. Von Bramer and Charles W. Hequembourg, Kingsport, Tenn., assignors to Eastman Kodak Company, Rochester, N.Y., a corporation of New Jersey
Filed Jan. 13, 1964, Ser. No. 337,223
Int. Cl. C08f *45/52, 45/28*
U.S. Cl. 260—31.8
8 Claims This invention relates to novel compositions of matter, their preparation and their uses. The novel compositions of matter, useful as plasticizer extenders and as resins, are liquid and solid products prepared from DAC–B, a complex hydrocarbon mixture which is the liquid residual fraction of the debutanized residue from the pyrolysis of a natural gas stream predominantly comprising propane.

DAC–B, also known as Debutanized Aromatic Concentrate-B, is a complex mixture of saturated, olefinically unsaturated and aromatic hydrocarbons having an initial boiling point greater than about 60° C.

Because the composition of DAC–B changes upon heating, it is not practical to conduct a complete ASTM distillation test. However, after hydrogenation, a typical DAC–B sample distills as follows:

ASTM distillation range

| | |
|---|---|
| Initial | temperature ° C 68 |
| 5% | do 92 |
| 10% | do 101 |
| 20% | do 119 |
| 30% | do 130 |
| 40% | do 143 |
| 50% | do 158 |
| 60% | do 182 |
| 70% | do 203 |
| 80% | do 235 |
| 90% | do 283 |
| 93% | do 316 |
| Bottoms | percent 4 |
| Loss | do 3 |

Other tests have determined that samples of DAC–B contain from about 87% to about 91% carbon and from about 9% to about 13% hydrogen and have an iodine number ranging from about 195 to about 275.

Though it is not practical to fully analyze DAC–B, we have determined that it contains at least 70 different compounds some of the more important of which are toluene, mixed xylenes, styrene, 5-methylbicyclohept-2-ene and 6-vinyl-5-methylbicyclohept-2-ene.

We have separated a sample of DAC–B into three portions by distilling, without heating, at 0.1 mm. pressure. The lowest boiling portion, comprising 82% by volume of the total sample, was analyzed by Fluorescent Indicator Absorption Analysis and found to contain 46.8% aromatics, 35.2% olefins and 18% paraffins. It was not possible to analyze the other two portions by this method because they exhibited fluorescent properties.

The exact composition of DAC–B can be varied and depends on, among other things, the composition of the natural gas cracking feed, the temperature and pressure in the cracking furnace, the residence time in the cracking furnace, the operating temperatures and pressure in the distillation columns used in recovering the pyrolysis products, etc.

The preparation of DAC–B is illustrated in FIGURE 1, a schematic flow diagram of a typical process for preparing DAC–B.

The natural gas cracking feed, consisting predominantly of propane is passed via line 1 into cracking furnace 2 where it is heated to a temperature of about 700° C. to about 800° C. at a pressure of about 10 to about 75 pounds per square inch gauge (hereafter referred to as p.s.i.) for a period of about 1 second. The effluent gas from the cracking furnace is withdrawn via line 3 and is quenched in quencher 4 and passed via line 5 into absorber 6 where it flows upward countercurrent to an absorption oil introduced into absorber 6 via line 7. Components of the effluent gas having more than 1 carbon atom are absorbed by the absorption oil. The enriched absorption oil then flows out of the absorber through line 9 and into debutanizer column 10 where i-butane and lower boiling components are removed overhead via line 11. The lean absorption oil, known as DAC or debutanized aromatic concentrate flows out of the debutanizer column via line 12 into distillation column 13 where it is separated into two fractions by distillation. The overhead fraction, known as DAC–A, is withdrawn via line 7 and removed via line 14 or recycled to absorber 6 as absorption oil. The higher boiling fraction, withdrawn as a residue via line 15, is DAC–B.

We have found that DAC–B can be converted into products of unexpected utility by polymerizing the DAC–B and hydrogenating the crude DAC–B polymer without any treatment or refining of the DAC–B polymer. The hydrogenated DAC–B polymer can be separated into solid and liquid fractions which are odorless and essentially water white. The liquid fractions are useful as secondary plasticizers for various synthetic resins, particularly for poly(vinylchloride)resins. The solid fraction of the hydrogenated DAC–B polymer is useful as a melt coating material, in floor tiles, caulking compounds, floor waxes, printing inks, etc.

The novel products of the invention can be prepared by hydrogenating a crude DAC–B polymer. The hydrogenation is preferably carried out with the aid of a metallic hydrogenation catalyst at elevated temperature and pressure. Suitable metallic hydrogenation catalysts include nickel and palladium catalysts such as Raney nickel, palladium on carbon or palladium on alumina. The hydrogenation is preferably carried out at a temperature of about 100° C. to about 300° C. and a hydrogen pressure of about 500 pounds per square inch gauge (hereinafter referred to as p.s.i.g.) to about 6000 p.s.i.g. and more preferably at a temperature of about 130° C. to about 260° C. and a hydrogen pressure of about 1000 p.s.i.g. to about 5000 p.s.i.g.

The crude DAC–B polymer which is subjected to hydrogenation can be either a DAC–B homopolymer or a copolymer of DAC–B and ethylenically unsaturated diacyl monomer, e.g., maleic anhydride or fumaric acid. The DAC–B polymer can be prepared by polymerizing DAC–B or DAC–B and the unsaturated diacyl monomer in the presence of an aprotonic Lewis acid polymerization catalyst, of which BF$_3$ or AlCl$_3$ are preferred examples, at a temperature less than about 170° C., preferably less than about 150° C. The polymerization is preferably carried out by cooling the mixture to be polymerized, i.e., DAC–B or DAC–B and an ethylenically unsaturated diacyl monomer, to a temperature of about 0° C. to about 15° C. and slowly adding the aprotonic Lewis acid polymerization catalyst. The mixture is then heated until the polymerization proceeds exothermally. The reaction temperature is maintained at less than about 170° C. and preferably less than about 150° C. by means of external cooling. When the reaction temperature begins to drop the polymeric mixture is refluxed for three or four hours while the reaction vessel is purged with nitrogen.

In order to produce the desired products, it is imperative that the crude DAC–B polymer, prepared as described above, by hydrogenated without any treatment or refinement. If the crude DAC–B polymer is separated into solid and liquid portions prior to the hydrogenation, the resulting hydrogenated products have an unpleasant odor and a color which renders them unfit for the uses described herein.

The hydrogenated DAC–B polymer can be separated into a solid portion and one or more liquid portions. A preferred method of separating the hydrogenated DAC–B polymer is by vacuum distillation.

The softening point of the solid residue of the hydrogenated DAC–B polymer can be controlled by varying the temperature at which vacuum distillation is stopped. Ring and ball softening points of from about 90° C. to about 130° C. can be obtained by this procedure. The solid residue recovered from the hydrogenated DAC–B homopolymer is an essentially water white resin which is useful in floor tiles, caulking compounds, melt coating compositions, etc.

The solid residue recovered from the hydrogenated copolymer of DAC–B and unsaturated diacyl monomer is a transparent water soluble solid which can have an acid number of about 5 to about 250 depending upon the acyl content of the polymer. This water soluble solid residue is useful as a leveling agent for floor waxes, as a binder for non-woven fabrics and as a component of insulating materials.

The liquid plasticizer extenders obtained from a hydrogenated DAC–B polymer can be used in conjunction with primary plasticizers, e.g., di-octyl phthalate, to plasticize a variety of synthetic resins such as poly(vinylchloride). The liquid hydrogenated DAC–B plasticizer extender can replace up to 40% of the primary plasticizer in such plasticized compositions, i.e., the total amount of plasticizer included in the resin can contain up to 67 parts of liquid hydrogenated DAC–B plasticizer extender per 100 parts of primary plasticizer.

Preferred as a plasticizer extender is the liquid hydrogenated DAC–B polymer fraction having a boiling range of about 65° C., to about 165° C. at a pressure of 100–200 microns.

The liquid hydrogenated DAC–B polymer fractions can be separated from the hydrogenated DAC–B polymer by vacuum distillation and can be incorporated into the resin to be plasticized by conventional methods, e.g., by milling on hot rolls.

The following examples illustrate the preparation of the novel hydrogenated DAC–B polymer products of the invention. All proportions are by weight unless otherwise indicated.

EXAMPLE 1

Twenty-five hundred parts of DAC–B are charged to a round bottom flask equipped with a stirrer, nitrogen inlet tube, addition funnel and reflux condenser. The DAC–B it stirred under nitrogen and chilled to 5° C. to 10° C. Fifty-two parts of boron trifluoride etherate (1% BF$_3$) are added dropwise over a 25-minute to 30-minute interval. The chilled mixture is stirred for an additional thirty minutes and allowed to warm to room temperature. External heat is applied to raise the temperature to 60–70° C. The reaction then proceeds exothermically and a cooling bath is used to hold the temperature in the range of 60–110° C. After the temperature begins to fall, external heat is applied and the mixture is refluxed at 130° C.–140° C. for four hours with a nitrogen purge to remove any BF$_3$ gas remaining in the system.

Seven hundred fifty parts of the polymerized DAC–B is removed from the flask and hydrogenated over a palladium on carbon catalyst at 250° C. under 4000 p.s.i. hydrogen pressure. The crude viscous hydrogenated material is diluted with heptane, filtered to remove the hydrogenation catalyst and stripped of heptane to 90° C. at 200–250 mm. pressure. The polymerized, hydrogenated DAC–B is then separated into three fractions by high vacuum distillation. The low boiling fraction, boiling to 100° C. at 100–200 microns pressure, is a water-white liquid. The intermediate fraction, boiling from 100° C. to 145° C. at 100–200 microns pressure, is also a water-white liquid. The residue is an essentially water-white resin which has a ring and ball softening point of 116° C.

EXAMPLE 2

One thousand four hundred parts of DAC–B and three hundred fifty parts of maleic anhydride are charged to a flask as in Example 1. The mixture is heated to 60–100° C. for from 15 to 30 minutes. The mixture is then cooled to 10° C. and 36 parts of BF$_3$ ethylether is added dropwise over a 15–30 minute period. The mixture is then warmed to room temperature at which time the exothermic polymerization reaction commences. The temperature of the mixture is allowed to rise to about 80° C. at which time the reaction temperature is controlled by means of an external cooling bath. After the polymerization is completed, the mixture is refluxed for four hours.

The polymerized DAC–B is hydrogenated over a palladium on carbon catalyst in a manner similar to Example 1. Purification in a manner similar to Example 1 gives water-white liquid fractions and a transparent pale green-yellow resin which has an acid number of 122 and a ring and ball softening point of 127° C.

EXAMPLE 3

One thousand parts of DAC–B are polymerized by the method of Example 1. Forty-eight percent of the polymerized DAC–B is hydrogenated over palladium over alumina at 4000 p.s.i. of hydrogen and 250° C.

The polymerized hydrogenated DAC–B is diluted with heptane, filtered to remove hydrogenation catalyst and stripped of heptane to 110° C. at a pressure of 200 mm. Water-white fractions, boiling to 175° C. at 100–200 microns are recovered by vacuum distillation. The residue is a water-white resin with a ring and ball softening point of 118° C.

EXAMPLE 4

Fifty-two percent of the polymerized DAC–B prepared in Example 3 is hydrogenated at 250° C. and 4000 p.s.i. hydrogen pressure over a palladium on carbon catalyst that has been previously used twice for polymerized DAC–B hydrogenation. The products are recovered as in Example 2 and consist of a water-white liquid fraction and a water-white resin having a ring and ball softening point of 115° C.

EXAMPLE 5

One thousand parts of DAC–B are polymerized as in Example 1 and hydrogenated at 140° C.–150° C. and 1500–2000 p.s.i. over a Raney nickel catalyst.

The products are recovered as in Example 3. The liquid fraction and the resin are water-white.

The following examples illustrate preparation of the novel plasticized resins of our invention containing a liquid fraction from hydrogenated DAC–B polymer as a plasticizer extender.

EXAMPLE 6

A liquid fraction of polymerized, hydrogenated DAC–B prepared by the method of Example 1 having a boiling range from 65° C. to 165° C. at 100–200 microns pressure is milled into a poly(vinylchloride) resin at two concentrations with di(2-ethylhexyl)-phthalate as the primary plasticizer.

EXAMPLE 7

A DAC–B maleic anhydride copolymer is prepared by the method of Example 2. The fraction boiling from 65° C. to 165° C. at 100–200 microns pressure is milled into a poly(vinylchloride) resin at two concentrations.

Table I, below, compares the properties of the plasticized resins of Examples 6 and 7 with a plasticized resin containing only primary plasticizer.

TABLE I

| Formulation: | | | | | | |
|---|---|---|---|---|---|---|
| PVC resin | 100 | 100 | 100 | 100 | 100 | 100 |
| Di-2-ethylhexyl phthalate | 50 | 40 | 30 | 50 | 40 | 30 |
| DAC-B resin (Example 6) | | 10 | 20 | | | |
| DAC-B resin (Example 7) | | | | | 10 | 20 |
| Stabilizer | 4 | 4 | 4 | 4 | 4 | 4 |
| Properties: | | | | | | |
| Tensile strength, p.s.i | 3,000 | 3,000 | 3,200 | 3,000 | 3,000 | 3,000 |
| Tear resistance, p.p.i | 385 | 410 | 475 | 385 | 430 | 440 |
| Elongation, percent | 375 | 350 | 340 | 375 | 360 | 330 |
| Durometer hardness, 5 sec | 85 | 87 | 94 | 85 | 87 | 94 |
| Soapy water ext., percent | 0.6 | 1.3 | 2.0 | 0.6 | 1.5 | 2.0 |
| Heptane extraction, percent | 24 | 21 | 19 | 24 | 22 | 19 |
| Activated carbon loss, percent | 1.5 | 4.3 | 6.4 | 1.5 | 4.1 | 6.7 |
| Tf 35,000 p.s.i., °C | −26 | −20 | −15 | −26 | −19 | −16 |
| Tf 135,000 p.s.i., °C | −53 | −42 | −39 | −53 | −40 | −40 |

Thus, by our invention, we have provided novel plasticizer extenders and novel resins made from hydrogenated DAC–B polymer. In addition, we have provided novel plasticized compositions of unusual value.

The invention has been described in considerable detail with particular reference to certain preferred embodiments thereof, but it will be understood that variations and modifications can be effected within the spirit and scope of the invention as described hereinbefore and as defined in the appended claims.

We claim:

1. An organic composition prepared by hydrogenating, without prior separation into solid and liquid portions and at an elevated temperature and pressure in the presence of a metallic hydrogenation catalyst, a crude polymer selected from the group consisting of:
   (a) the crude homopolymer prepared by polymerizing DAC–B in the presence of an aprotonic Lewis acid polymerization catalyst and
   (b) the crude copolymer prepared by copolymerizing DAC–B and an ethylenically unsaturated diacyl monomer in the presence of an aprotonic Lewis acid polymerization catalyst, wherein said DAC–B is the liquid residual fraction of the debutanized residue from the pyrolysis at a temperature of about 700 to about 800° C. and a pressure of about 10 to about 75 pounds per square inch gauge for a period of about one second of a natural gas stream predominantly comprising propane, said liquid residual fraction having an initial boiling point greater than about 60° C., an iodine number of about 195 to about 275, and containing about 87 to about 91 percent carbon and about 9 to about 13 percent hydrogen, and capable of being separated into three portions by distilling without heating at 0.1 mm. pressure.

2. An organic composition prepared by hydrogenating, without prior separation into solid and liquid portions and at a temperature of about 100° to about 300° C. and a hydrogen pressure of about 500 to about 6000 pounds per square inch gauge in the presence of a metallic hydrogenation catalyst, a crude polymer selected from the group consisting of:
   (a) the crude homopolymer prepared by polymerizing DAC–B at a temperature of about 20° to about 170° C. in the presence of an aprotonic Lewis acid polymerization catalyst and
   (b) the crude copolymer prepared by copolymerizing DAC–B and an ethylenically unsaturated diacyl monomer at a temperature less than about 170° C. in the presence of an aprotonic Lewis acid polymerization catalyst, wherein said DAC–B is the liquid residual fraction of the debutanized residue from the pyrolysis at a temperature of about 700 to about 800° C. and a pressure of about 10 to about 75 pounds per square inch gauge for a period of about one second of a natural gas stream predominantly comprising propane, said liquid residual fraction having an initial boiling point greater than about 60° C., an iodine number of about 195 to about 275, and containing about 87 to about 91 percent carbon and about 9 to about 13 percent hydrogen, and capable of being separated into three portions by distilling without heating at 0.1 mm. pressure.

3. An organic composition prepared by hydrogenating, without prior separation into solid and liquid portions and at a temperature of about 130° to about 260° C. and a hydrogen pressure of about 1000 to about 5000 pounds per square inch gauge in the presence of a metallic hydrogenation catalyst selected from the group consisting of Raney nickel and palladium, a crude polymer selected from the group consisting of:
   (a) the crude homopolymer prepared by polymerizing DAC–B at a temperature of about 0° to about 150° C. in the presence of an aprotonic Lewis acid polymerization catalyst selected from the group consisting of $BF_3$ and $AlCl_3$ and
   (b) the crude copolymer prepared by copolymerizing DAC–B and maleic anhydride at a temperature less than about 150° C. in the presence of an aprotonic Lewis acid polymerization catalyst selected from the group consisting of $BF_3$ and $AlCl_3$, wherein said DAC–B is the liquid residual fraction of the debutanized residue from the pyrolysis at a temperature of about 700 to about 800° C. and a pressure of about 10 to about 75 pounds per square inch gauge for a period of about one second of a natural gas stream predominantly comprising propane, said liquid residual fraction having an initial boiling point greater than about 60° C., an iodine number of about 195 to about 275, and containing about 87 to about 91 percent carbon and about 9 to about 13 percent hydrogen, and capable of being separated into three portions by distilling without heating at 0.1 mm. pressure.

4. A liquid plasticizer extender comprising a lower boiling portion of the organic composition as defined by claim 1.

5. A solid resin comprising a higher boiling portion of the organic composition as defined by claim 1.

6. A plasticized thermoplastic resinous composition containing at least one primary plasticizer and up to 67 parts of a liquid plasticizer extender as defined by claim 4 per 100 parts of primary plasticizer.

7. A plasticized poly(vinylchloride) resin containing at least one primary plasticizer and up to 67 parts of a liquid plasticizer extender as defined by claim 4 per 100 parts of primary plasticizer.

8. A plasticized poly(vinylchloride) resin containing dioctyl phthalate as a primary plasticizer and up to 67 parts of a liquid plasticizer extender as defined by claim 4 per 100 parts of primary plasticizer.

(References on following page)

References Cited

UNITED STATES PATENTS

| | | | |
|---|---|---|---|
| 2,150,641 | 3/1939 | Thomas et al. | 260—82 |
| 2,497,045 | 2/1960 | Killingsworth et al. | 260—33.6 |
| 2,861,965 | 11/1958 | Roncoroni | 260—33.6 |
| 2,911,395 | 11/1959 | Small | 260—82 |
| 2,963,467 | 12/1960 | Small | 260—82 |
| 3,005,800 | 10/1961 | Powers et al. | 260—82 |
| 3,040,009 | 6/1962 | Wadsworth et al. | 260—82 |

FOREIGN PATENTS

| | | |
|---|---|---|
| 579,095 | 7/1959 | Canada. |
| 766,894 | 1/1957 | Great Britain. |

JOSEPH L. SCHOFER, *Primary Examiner.*

J. C. HAIGHT, *Assistant Examiner.*

U.S. Cl. X.R.

260—33.6, 78.5, 82